(12) United States Patent
Nakamura et al.

(10) Patent No.: US 11,292,918 B2
(45) Date of Patent: Apr. 5, 2022

(54) COLORANT-CONTAINING SOLID MATERIAL AND METHOD FOR MANUFACTURING COLORANT-CONTAINING SOLID MATERIAL

(71) Applicant: Nippon Sheet Glass Company, Limited, Tokyo (JP)

(72) Inventors: Koichiro Nakamura, Kanagawa (JP); Kazuhiro Doshita, Mie (JP); Haruko Horiguchi, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/641,058

(22) PCT Filed: Jul. 20, 2018

(86) PCT No.: PCT/JP2018/027377
§ 371 (c)(1),
(2) Date: Feb. 21, 2020

(87) PCT Pub. No.: WO2019/039160
PCT Pub. Date: Feb. 28, 2019

(65) Prior Publication Data
US 2021/0032476 A1    Feb. 4, 2021

(30) Foreign Application Priority Data

Aug. 25, 2017 (JP) .............................. JP2017-162103
Oct. 5, 2017 (JP) .............................. JP2017-195032

(51) Int. Cl.
C09C 3/12    (2006.01)
C09C 3/06    (2006.01)
(Continued)

(52) U.S. Cl.
CPC ................ *C09C 3/12* (2013.01); *C09B 68/41* (2013.01); *C09C 1/30* (2013.01); *C09C 3/063* (2013.01); *C01P 2002/82* (2013.01)

(58) Field of Classification Search
None
See application file for complete search history.

(56) References Cited

U.S. PATENT DOCUMENTS

2011/0260110 A1    10/2011    Mikami
2015/0110842 A1    4/2015    Jeanne-Rose

FOREIGN PATENT DOCUMENTS

CN    105623643    6/2016
JP    2001011342    1/2001
(Continued)

OTHER PUBLICATIONS

Machine translation JP2001011342 (Year: 2001).*
(Continued)

*Primary Examiner* — Alexandre F Ferre
(74) *Attorney, Agent, or Firm* — Hamre, Schumann, Mueller & Larson, P.C.

(57) ABSTRACT

A colorant-containing solid material (1) of the present invention includes a colorant (10) and a matrix (20). The matrix (20) is formed of a silica and a polysilsesquioxane and covers the colorant (10). An absorption intensity derived from a hydrocarbon group that is not directly bonded to a silicon atom, an absorption intensity derived from a bond between a silicon atom and a non-reactive functional group, and an absorption intensity derived from a bond between a silicon atom and a hydroxy group, determined by an infrared spectroscopic analysis based on a KBr pellet method using a Fourier transform infrared spectrophotometer, are denoted (Continued)

as Ia, Ib and Ic, respectively. The colorant-containing solid material (1) satisfies at least one of conditions Ib/Ia≥1.1 and Ib/Ic≥0.6.

7 Claims, 6 Drawing Sheets

(51) Int. Cl.
  *C09C 1/30* (2006.01)
  *C09B 67/00* (2006.01)

(56) References Cited

FOREIGN PATENT DOCUMENTS

| JP | 2003500428 | 1/2003 |
|---|---|---|
| JP | 2003286416 | 10/2003 |
| JP | 2007099859 | 4/2007 |
| JP | 2008534413 | 8/2008 |
| JP | 2008247713 | 10/2008 |
| JP | 2010235782 | 10/2010 |
| JP | 2012528913 | 11/2012 |
| JP | 2013237051 | 11/2013 |
| JP | 2015067741 | 4/2015 |
| JP | 2015521659 | 7/2015 |
| JP | 2017003815 | 1/2017 |
| WO | 0072806 | 12/2000 |
| WO | 2006109548 | 10/2006 |
| WO | 2008072239 | 6/2008 |
| WO | 2010139746 | 12/2010 |
| WO | 2016126677 | 8/2016 |

OTHER PUBLICATIONS

International Search Report and Written Opinion issued for International Patent Application No. PCT/JP2018/027377, dated Oct. 16, 2018, 9 pages including English translation of Search Report.

Itagaki, Y. et al., "Development of porphyrin dispersed sol-gel films as HCl sensitive optochemical gas sensor," Sensors and Actuators B: Chemical, vol. 117, 2006, pp. 302-307.

Carturan, S. et al., "3-Hydroxyflavone-based wavelength shifting systems for near UV optical sensors," Sensors and Actuators A: Physical, vol. 113, 2004, pp. 288-292.

Raditoiu, A. et al., "Non-ionic Dyes in Silica Hybrid Materials as Coloured Coatings on Protein Fibers," Revista de Chimie, vol. 65, No. 9, 2014, pp. 1002-1007.

Extended European Search Report issued for European Patent Application No. 18847935.6, dated Apr. 28, 2021, 10 pages.

* cited by examiner

COLORANT-CONTAINING SOLID MATERIAL AND METHOD FOR MANUFACTURING COLORANT-CONTAINING SOLID MATERIAL

TECHNICAL FIELD

The present invention relates to a colorant-containing solid material and a method for manufacturing the colorant-containing solid material.

BACKGROUND ART

Techniques for covering a functional material, such as a colorant, have conventionally been known. For example, Patent Literature 1 describes a sol-gel microcapsule encapsulating a sunscreen compound. The sol-gel microcapsule is a silica microcapsule, for example.

Patent Literature 2 describes a method for preparing a nanocapsule having a core-shell structure. In this nanocapsule, a core material including an active ingredient, such as a coloring agent and a dye, is encapsulated in a metal oxide shell. To obtain the nanocapsule, conditions for hydrolyzing and polycondensing a sol-gel precursor are applied.

Patent Literature 3 describes a glass flake material containing an organic colorant and at least one selected from a phosphoric acid and a phosphate compound. This flake material contains an oxide of an element other than phosphorus as its main component. The containing of the phosphoric acid and/or the phosphate compound improves the elution resistance of the organic colorant.

Patent Literature 4 describes a fluorochrome-containing flake material. In this fluorochrome-containing flake material, at least one organic fluorochrome is dispersed and a phosphate compound is contained in a metal oxide flake obtained by a sol-gel method. According to the Patent Literature 4, the fluorochrome-containing flake material is excellent in terms of elution resistance of the organic fluorochrome.

CITATION LIST

Patent Literature

Patent Literature 1: JP 2003-500428 A
Patent Literature 2: JP 2013-237051 A
Patent Literature 3: JP 2008-534413 A
Patent Literature 4: JP 2007-99859 A

SUMMARY OF INVENTION

Technical Problem

Based on the descriptions of the Patent Literatures 1 to 4, there is still room for designing a novel colorant-covering technique that makes a colorant unlikely to elute by improving a material to cover the colorant. Therefore, the present invention provides a novel colorant-containing solid material from which a colorant is unlikely to elute. The present invention also provides a method for manufacturing such a colorant-containing solid material.

Solution to Problem

The present invention provides a colorant-containing solid material including;
a colorant; and
a matrix that is formed of a silica and a polysilsesquioxane and covers the colorant, wherein when an absorption intensity derived from a hydrocarbon group that is not directly bonded to a silicon atom, an absorption intensity derived from a bond between a silicon atom and a non-reactive functional group, and an absorption intensity derived from a bond between a silicon atom and a hydroxy group, determined by an infrared spectroscopic analysis based on a KBr pellet method using a Fourier transform infrared spectrophotometer, are denoted as $I_a$, $I_b$ and $I_c$, respectively, at least one of conditions $I_b/I_a \geq 1.1$ and $I_b/I_c \geq 0.6$ is satisfied.

The present invention also provides a method for manufacturing a colorant-containing solid material,
the colorant-containing solid material including a colorant, and a matrix that is formed of a silica and a polysilsesquioxane and covers the colorant, and
the method including solidifying a sol containing a precursor of the matrix and the colorant and thereby producing a solidified product, and drying the solidified product.

Advantageous Effects of Invention

The colorant-containing solid material mentioned above is characterized in that a colorant is unlikely to elute therefrom. Furthermore, the above-mentioned method makes it possible to manufacture a novel colorant-containing solid material from which a colorant is unlikely to elute.

DESCRIPTION OF EMBODIMENTS

Hereinafter, embodiments of the present invention will be described with reference to the drawings. The following description concerns examples of the present invention, and the present invention is not limited to the following description.

Figure 1:
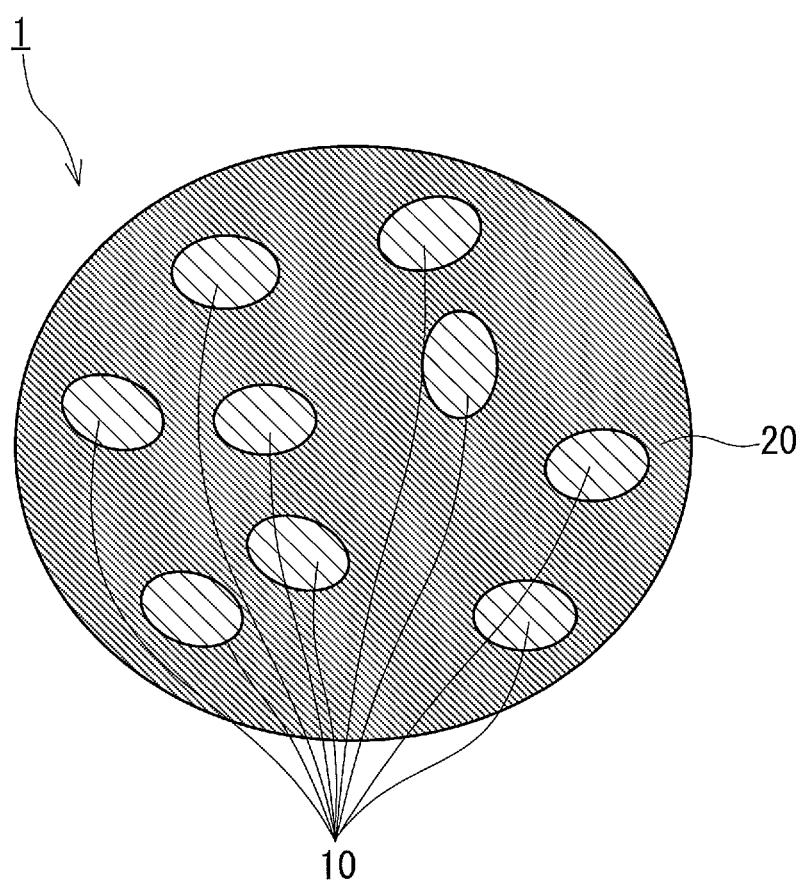
FIG. 1 is a cross-sectional view schematically illustrating the structure of an example of a colorant-containing solid material of the present invention.

As shown in FIG. 1, a colorant-containing solid material 1 includes a colorant 10 and a matrix 20. The matrix 20 is formed of a silica and a polysilsesquioxane and covers the colorant 10. The colorant-containing solid material 1 undergoes an infrared spectroscopic analysis based on a KBr pellet method using a Fourier transform infrared spectrophotometer. An absorption intensity derived from a hydrocarbon group that is not directly bonded to a silicon atom, an absorption intensity derived from a bond between a silicon atom and a non-reactive functional group, and an absorption intensity derived from a bond between a silicon atom and a hydroxy group, determined by this infrared spectroscopic analysis, are denoted as Ia, Ib and Ic, respectively. The colorant-containing solid material 1 satisfies at least one of conditions Ib/Ia≥1.1 and Ib/Ic≥0.6. In this description, Ib/Ia is also called an organic-inorganic parameter (D) and Ib/Ic is also called a hydrophobicity parameter (H). The absorption intensity Ia, the absorption intensity Ib and the absorption intensity Ic can be determined, for example, from an infrared transmission spectrum obtained by the above-mentioned infrared spectroscopic analysis in accordance with methods described in Examples.

Typically, the silica in the matrix 20 is formed by hydrolysis and dehydration condensation of a tetrafunctional alkoxysilane, and the polysilsesquioxane in the matrix 20 is formed by hydrolysis and dehydration condensation of a trifunctional alkoxysilane. For example, a tetrafunctional alkoxysilane forms a silica ($SiO_2$) by the following reactions (Formula 1) and (Formula 2). $R_a$ indicates an alkyl group. A trifunctional alkoxysilane forms a polysilsesquioxane ($R_b$-$SiO_{3/2}$) by the following reactions (Formula 3) and (Formula 4). $R_b$ indicates a non-reactive functional group, and $R_c$ indicates an alkyl group.

$$Si(OR_a)_4 + 4H_2O \rightarrow Si(OH)_4 + 4R_aOH \quad \text{(Formula 1)}$$

$$Si(OH)_4 \rightarrow SiO_2 + 2H_2O \quad \text{(Formula 2)}$$

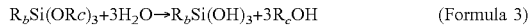

$$R_bSi(ORc)_3 + 3H_2O \rightarrow R_bSi(OH)_3 + 3R_cOH \quad \text{(Formula 3)}$$

$$R_bSi(OH)_3 \rightarrow R_bSiO_{3/2} + 3/2 H_2O \quad \text{(Formula 4)}$$

In the reactions represented by the formula (3) and the formula (4), the non-reactive functional group $R_b$ of the trifunctional alkoxysilane remains bonded to a silicon atom. In contrast, in the reactions represented by the formulae (1) to (4), an alkoxy group of the tetrafunctional alkoxysilane and that of the trifunctional alkoxysilane each are substituted by a hydroxy group, and such hydroxy groups are condensed together to form a network composed of Si—O—Si. The organic-inorganic parameter (D) increases as the hydrocarbon groups that are included in the matrix 20 and that each are not directly bonded to a silicon atom are less in quantity. When the hydrocarbon groups that are included in the matrix 20 and that each are not directly bonded to a silicon atom are less in quantity, the network of Si—O—Si in the matrix 20 is dense as well as an inorganic ingredient density in the matrix 20 increases. This allows the colorant to be firmly fixed to the dense Si—O—Si network. Therefore, 1.1 or more of the organic-inorganic parameter (D) makes it unlikely for the colorant 10 to elute from the colorant-containing solid material 1.

The hydrophobicity parameter (H) increases as the hydroxy groups each bonded to a silicon atom in the matrix 20 are less in quantity. When the hydroxy groups are condensed together to develop the network composed of Si—O—Si, the hydroxy groups each bonded to a silicon atom in the matrix 20 decreases in quantity. When the hydrophobicity parameter (H) is equal to or greater than a predetermined value, the network composed of Si—O—Si is developed densely in the matrix 20 and the colorant 10 can be firmly fixed by the network. In addition, although a silanol group (Si—OH) has a high affinity with a water molecule, when the hydrophobicity parameter (H) is equal to or greater than a predetermined value, the hydroxy groups each bonded to a silicon atom are small in quantity in the matrix 20, and thus the matrix 20 is likely to exhibit hydrophobicity. This makes it unlikely for water molecules to enter into the colorant-containing solid material 1. As a result, the colorant 10 is unlikely to elute from the colorant-containing solid material 1. From such a viewpoint, 0.6 or more of the hydrophobicity parameter (H) makes it unlikely for the colorant 10 to elute from the colorant-containing solid material 1.

In the colorant-containing solid material 1, it is desirable that the colorant-containing solid material 1 further satisfy the conditions Ib/Ia≥1.1 and Ib/Ic≥0.6 from the viewpoint of making it more unlikely for the colorant 10 to elute therefrom.

In the colorant-containing solid material 1, it is desirable that the colorant-containing solid material 1 further satisfy at least one of conditions Ib/Ia≥1.9 and Ib/Ic≥1.2 from the viewpoint of making it more unlikely for the colorant 10 to elute therefrom.

A hydrophobic effect is likely to be exhibited by the polysilsesquioxane included in the matrix 20, and a hydrophilic effect is likely to be exhibited by the silica included in the matrix 20. Therefore, by adjusting a ratio of a mass of the polysilsesquioxane to a mass of the silica in the matrix 20, it is possible to adjust the hydrophilicity or hydrophobicity of the colorant-containing solid material 1 to a suitable level. This makes it possible for the colorant-containing solid material 1 to be dispersed in an aqueous solvent while making it possible to inhibit the colorant 10 from eluting from the colorant-containing solid material 1. From such a viewpoint, the ratio of the mass of the polysilsesquioxane to the mass of the silica in the matrix 20 is ⅑ to 9, for example, and it is desirably ⅓ to 3 and more desirably ⅔ to 3/2.

In order that the polysilsesquioxane included in the matrix 20 exhibits a suitable hydrophobic effect, the non-reactive functional group bonded to a silicon atom in the matrix 20 is typically a functional group, such as an alkyl group, that shows hydrophobicity. Desirably, the polysilsesquioxane is a polysilsesquioxane in which a hydrocarbon group having 16 or less carbon atoms is bonded to a silicon atom as the non-reactive functional group. In this case, the non-reactive functional group is not bulky, and thus it is easy for the Si—O—Si network to be formed densely.

The shape of the colorant-containing solid material 1 is not particularly limited and it can be granular, fibrous or sheet-like, for example. In the case where the colorant-containing solid material 1 is granular, the colorant-containing solid materials 1 can be a spherical particle or a flaky particle.

The type of the colorant 10 is not particularly limited as long as the colorant 10 is covered with the matrix 20. For example, the colorant 10 can be a synthetic colorant or a mineral colorant such as a pigment. The synthetic colorant is, for example, red color No. 104-(1) represented by the following structural formula (I), blue color No. 1 represented by the following structural formula (II), yellow color No. 4 represented by the following structural formula (III), or red color No. 218 represented by the following structural formula (IV). The red color No. 104-(1) is also named as a disodium salt of 9-(3,4,5,6-tetrachloro-2-carboxyphenyl)-6-hydroxy-2,4,5,7-tetrabromo-3H-xanthene-3-one, phloxine B, D & C RED No. 28, or Acid Red 92. The blue color No. 1 is also named as 2-[α-[4-(N-ethyl-3-sulfobenzyliminio)-2,5-cyclohexa dienylidene]-4-(N-ethyl-3-sulfo benzylamino)benzyl]benzenesulfonate disodium salt, brilliant blue FCF, FD & C Blue No. 1, or Food Blue No. 1. The yellow color No. 4 is also named as Food Yellow No. 4, tartrazine, or FD & C Yellow No. 5. The red color No. 218 is also named as tetrachloro tetrabromofluorescein, 2',4',5',7'-tetrabromine-4,5,6,7-tetrachloro-3',6'-dihydroxyspiro]isobenzofuran-1(3H), [9'-[9H]xanthene]-3-one, D & C RED No. 27, or Solvent Red 48. The colorant 10 may be a lake (AL LAKE) of the above-mentioned colorants. The colorant 10 may be, for example, red color No. 202 (D & C Red No. 7, general name "Litholrubin BCA"), red color No. 230-(1) (D & C Red No. 22, general name "Eosine YS"), or a lake (AL LAKE) of these.

[Chemical Formula 1]

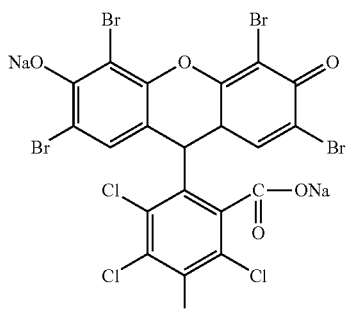

(I)

[Chemical Formula 2]

(II)

[Chemical Formula 3]

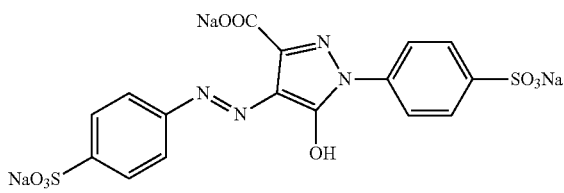

(III)

[Chemical Formula 4]

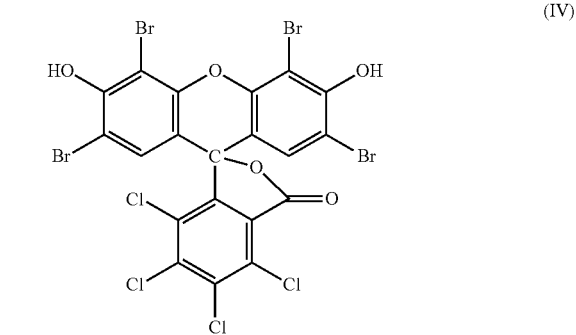

(IV)

The content of the colorant 10 in the colorant-containing solid material 1 is not particularly limited and it is 3 to 50 mass %, for example. Thereby, it is possible to produce an article that develops a desired color by using the colorant-containing solid material 1.

Typically, the colorant-containing solid material 1 is manufactured by a sol-gel method. For example, the colorant-containing solid material 1 can be manufactured by solidifying a sol containing a precursor of the matrix 20 and the colorant 10 and producing a solidified product, and drying the solidified product.

Desirably, this solidified product is heated at a temperature that is 110° C. or higher as well as being lower than a temperature at which the colorant is thermally decomposed. Thereby, it can be more unlikely for the colorant 10 to elute from the colorant-containing solid material 1.

The sol can be prepared, for example, by mixing a tetrafunctional alkoxysilane such as tetraethyl orthosilicate (tetraethoxysilane: TEOS), a trifunctional alkoxysilane such as methyltrimethoxysilane, a hydrolysis catalyst such as acetic acid, and pure water such as ion exchanged water, and allowing the mixture undergo the above-mentioned reactions (Formula 1) to (Formula 4) for a predetermined period of time.

The method for solidifying the sol is not particularly limited and it is a spray drying method, for example. In this case, it is easy to form the solidified product into a spherical shape, and accordingly it is easy to manufacture the colorant-containing solid material 1 into a spherical particle. It should be noted that the sol may be solidified by drying a coating film formed by applying the sol onto a predetermined substrate. In this case, it is possible to manufacture the colorant-containing solid material 1 in a sheet-like shape by peeling the solidified product from the substrate. Also, it is possible to manufacture the colorant-containing solid material 1 that is a flaky particle by peeling the solidified product from the substrate and crushing it.

The temperature at which the solidified product is heated is not particularly limited as long as it is 110° C. or higher as well as being lower than a temperature at which the colorant 10 is thermally decomposed. For example, in the case where the colorant 10 is the blue color No. 1, since the temperature at which the blue color No. 1 is thermally decomposed is 283° C., the temperature at which the solidified product is heated is 110° C. or higher as well as being lower than 283° C., and desirably it is 110° C. or higher as well as being lower than 250° C.

The colorant-containing solid material 1 may be manufactured by solidifying a sol containing a precursor of the matrix 20 and the colorant 10 and producing a solidified product, and heating the solidified product at a temperature lower than a temperature at which the colorant 10 is thermally decomposed in a vacuum or reduced pressure environment. In this case, the temperature at which the solidified product is heated can be 110° C. or lower. For example, the solidified product may be dried in a sample chamber adjusted to 100° C. and 1 Torr by use of a vacuum dryer.

EXAMPLES

The present invention will be described in more detail with examples. The present invention is not limited to the examples presented below. First, a method for evaluating colorant-containing solid materials according to Examples and Comparative Examples will be described.

[Organic-Inorganic Parameter (D) and Hydrophobicity Parameter (H)]

Figure 2:
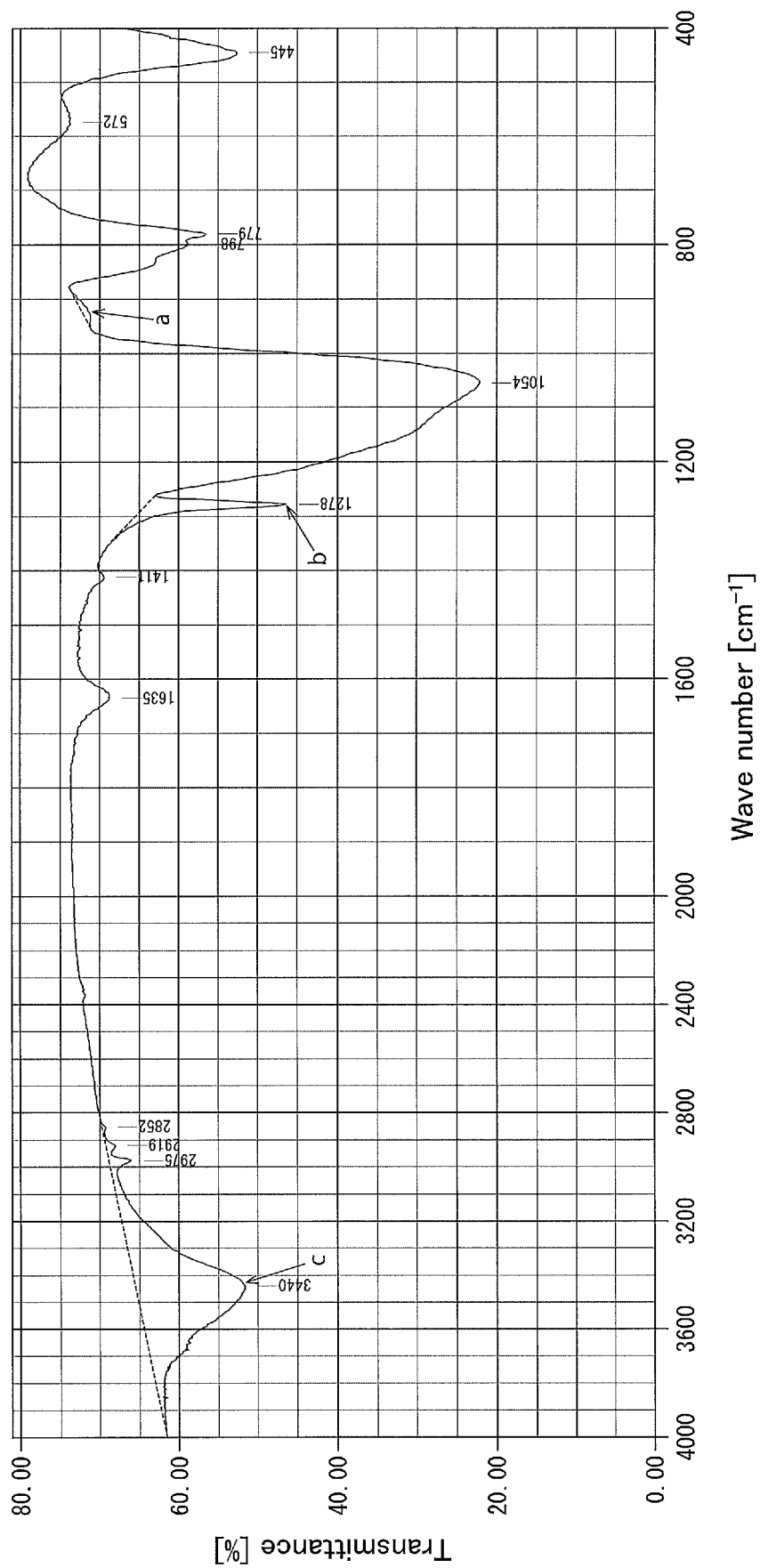
FIG. 2 is a graph showing an infrared transmission spectrum of a colorant-containing solid material according to Example 1 based on a KBr pellet method.
Figure 3:
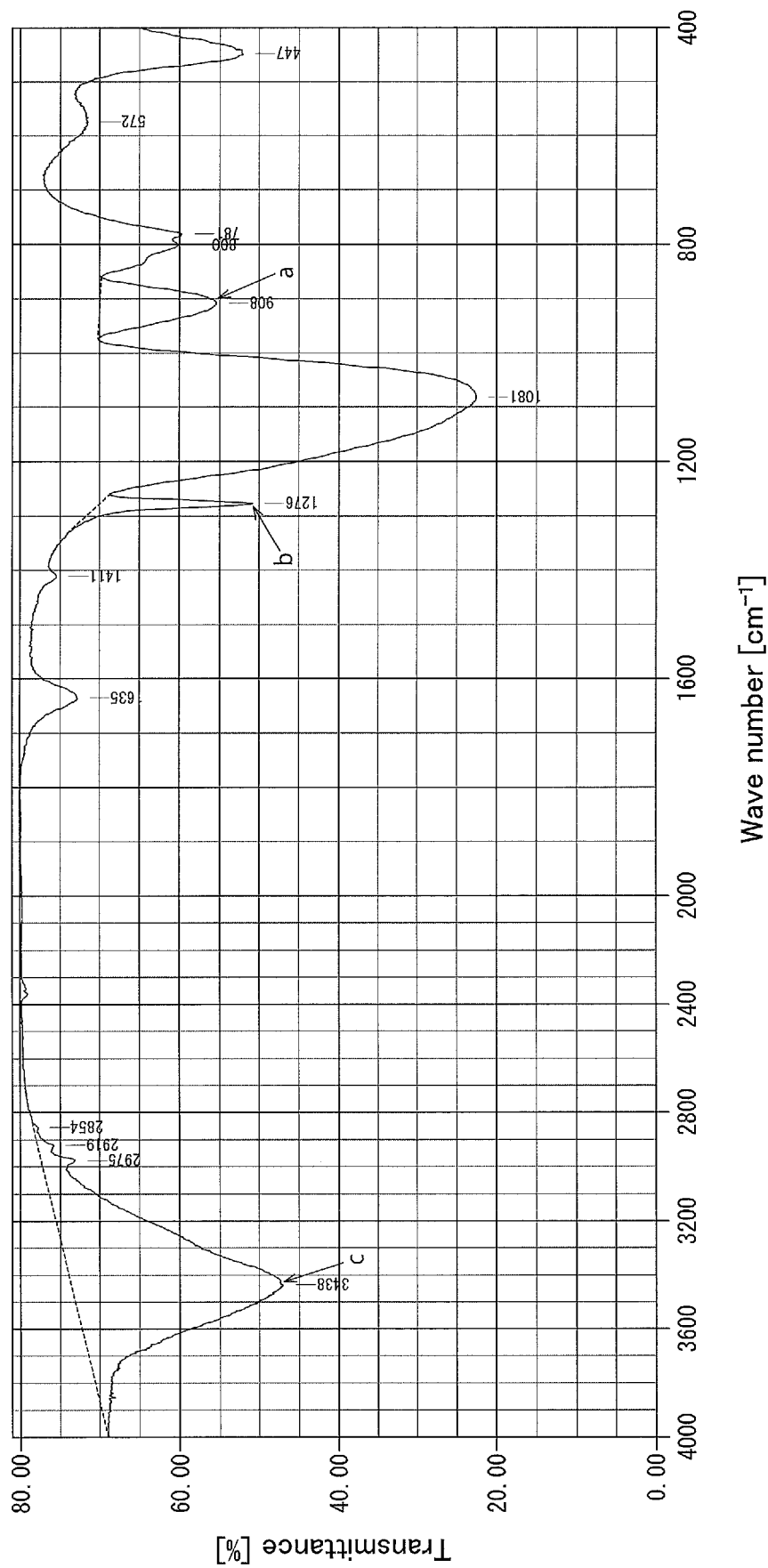
FIG. 3 is a graph showing an infrared transmission spectrum of a colorant-containing solid material according to Example 16 based on a KBr pellet method.
Figure 4:
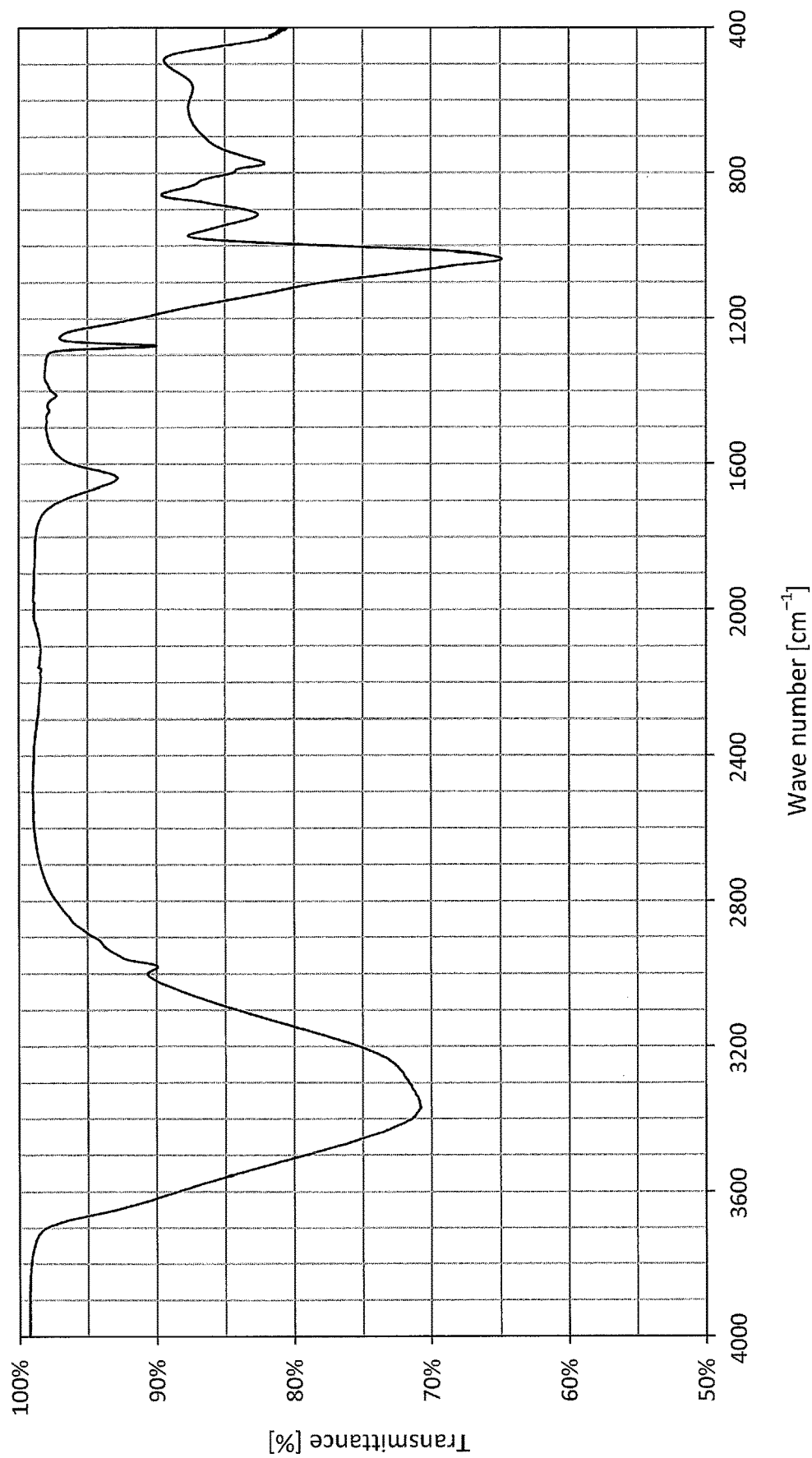
FIG. 4 is a graph showing an infrared transmission spectrum of a colorant-containing solid material according to Comparative Example 1 based on a KBr pellet method.

A colorant-containing solid material according to each Example and Comparative Example was measured for infrared transmission spectrum by a KBr (potassium bromide) pellet method using a Fourier transform infrared spectrophotometer (JIR-5500 available from JEOL Ltd.). 1 to 10 mg of the colorant-containing solid material that was powdery and 0.1 to 0.2 g of KBr were sufficiently mixed in a mortar, and then the resulting mixture was press-molded to make a specimen, having a diameter of 10 mm and a thickness of approximately 1 mm, for measuring the infrared transmission spectrum. FIG. 2 shows the result of the infrared transmission spectrum of the colorant-containing solid material according to Example 1, and FIG. 3 shows the result of the infrared transmission spectrum of the colorant-containing solid material according to Example 16. In addition, FIG. 4 shows the result of the infrared transmission spectrum of the colorant-containing solid material according to Comparative Example 1.

In the infrared transmission spectrum of the colorant-containing solid material according to each Example and Comparative Example, a minimal value of transmittance in an absorption band derived from hydrocarbon groups ($CH_3$ and $CH_2$) that each are not directly bonded to a silicon atom appeared in the wave number range of $910\pm50$ cm$^{-1}$. Also, a minimal value of transmittance in an absorption band derived from a bond between a silicon atom and a methyl group appeared in the wave number range of $1276\pm50$ cm$^{-1}$. Furthermore, a minimal value of transmittance in an absorption band derived from a bond between a silicon atom and a hydroxy group appeared in the wave number range of $3438\pm50$ cm$^{-1}$. In FIG. 2 and FIG. 3, the absorption band derived from hydrocarbon groups ($CH_3$ and $CH_2$) that each are not directly bonded to a silicon atom is denoted by symbol a, the absorption band derived from a bond between a silicon atom and a methyl group is denoted by symbol b, and the absorption band derived from a bond between a silicon atom and a hydroxy group is denoted by symbol c.

In the infrared transmission spectrum of the colorant-containing solid material according to each Example and Comparative Example, an absorbance was calculated from the minimal value of transmittance in the absorption band derived from hydrocarbon groups ($CH_3$ and $CH_2$) that each are not directly bonded to a silicon atom by the following (Formula 5). This absorbance is represented as $A_{min}(CH_3, CH_2)$. In addition, in this absorption band, as shown by the dashed lines in FIG. 2 and FIG. 3, a baseline was determined and an absorbance was calculated by the following (Formula 5) from a value of transmittance on the baseline in the wave number range in which the minimal value of transmittance appeared. This absorbance is represented as $A_{base}(CH_3, CH_2)$. From the absorbance $A_{min}(CH_3, CH_2)$ and the absorbance $A_{base}(CH_3, CH_2)$, an absorption intensity Ia derived from hydrocarbon groups that each are not directly bonded to a silicon atom was determined by the following (Formula 6).

Absorbance=$-\log$(transmittance/100)  (Formula 5)

Ia=$A_{min}(CH_3,CH_2)$-$A_{base}(CH_3,CH_2)$  (Formula 6)

In the infrared transmission spectrum of the colorant-containing solid material according to each Example and Comparative Example, an absorbance was calculated from the minimal value of transmittance in the absorption band derived from a bond (Si—$CH_3$) between a silicon atom and a methyl group by the (Formula 5). This absorbance is represented as $A_{min}$(Si—$CH_3$). In addition, in this absorption band, as shown by the dashed lines in FIG. 2 and FIG. 3, a baseline was determined and an absorbance was calculated by the (Formula 5) from a value of transmittance on the baseline in the wave number range in which the minimal value of transmittance appeared. This absorbance is represented as $A_{base}$(Si—$CH_3$). From the absorbance $A_{min}$(Si—$CH_3$) and the absorbance $A_{base}$(Si—$CH_3$), an absorption intensity Ib derived from a bond between a silicon atom and a methyl group was calculated by the following (Formula 7).

Ib=$A_{min}$(Si—$CH_3$)-$A_{base}$(Si—$CH_3$)  (Formula 7)

In the infrared transmission spectrum of the colorant-containing solid material according to each Example and Comparative Example, an absorbance was calculated from the minimal value of transmittance in the absorption band derived from a bond between a silicon atom and a hydroxy group by the (Formula 5). This absorbance is represented as $A_{min}$(Si—OH). In addition, in this absorption band, as shown by the dashed lines in FIG. 2 and FIG. 3, a baseline was determined and an absorbance was calculated by the (Formula 5) from a value of transmittance on the baseline in the wave number range in which the minimal value of transmittance appeared. This absorbance is represented as $A_{base}$(Si—OH). From the absorbance $A_{min}$(Si—OH) and the absorbance $A_{base}$(Si—OH), an absorption intensity Ic derived from a bond between a silicon atom and a hydroxy group was determined by the following (Formula 8).

Ic=$A_{min}$(Si—OH)-$A_{base}$(Si—OH)  (Formula 8)

Based on the absorption intensity Ia, the absorption intensity Ib and the absorption intensity Ic calculated as above, an organic-inorganic parameter (D) and a hydrophobicity parameter (H) were determined by the following (Formula 9) and (Formula 10). In the present example, the result of the infrared spectroscopic analysis was outputted as a graph of the transmittance with respect to the wave number. However, in the case where the result of the infrared spectroscopic analysis is outputted as a graph of the absorbance with respect to the wave number, the absorption intensity Ia, the absorption intensity Ib and the absorption intensity Ic may be determined by reading the absorbance that is to be indicated by the vertical axis of the graph. In FIG. 4, the baseline in each absorption band is omitted. However, as in each of the other Examples and Comparative Examples, the baseline in each absorption band of the infrared transmission spectrum was determined in the same manner as in FIG. 2 and FIG. 3, and the absorption intensity Ia, the absorption intensity Ib and the absorption intensity Ic were determined.

Organic-inorganic parameter (D)=Ib/Ia  (Formula 9)

Hydrophobicity parameter (H)=Ib/Ic  (Formula 10)

[Elution Percentage of Colorant]

2 g of the colorant-containing solid material according to each Example and Comparative Example was mixed into 200 ml (milliliter) of ion exchanged water and the resulting mixture was stirred at a room temperature for 3 hours. Thereafter, a supernatant liquid was taken therefrom and measured for absorbance at a maximum absorption wavelength of the colorant. The maximum absorption wavelength of the colorant in the case that the colorant was red color No. 10441) was assumed to be 539 nm, the maximum absorption wavelength of the colorant in the case that the colorant was blue color No. 1 was assumed to be 609 nm, and the maximum absorption wavelength of the colorant in the case that the colorant was yellow color No. 4 was assumed to be 486 nm. Using a calibration curve created for each colorant beforehand to indicate a relationship between the absorbance and the concentration of the colorant, a concentration Ca of the colorant in the supernatant liquid was calculated.

From the concentration Ca of the colorant in the supernatant liquid and a content Ct of the colorant included in the 2 g colorant-containing solid material, an elution percentage of the colorant was calculated by (Formula 11). The reciprocal of the elution percentage of the colorant was determined as an elution prevention factor. Table 1 shows the results.

Elution percentage [%]=100×{Ca[mg/ml]×200 [ml]}/Ct[mg]  (Formula 11)

Figure 5A:
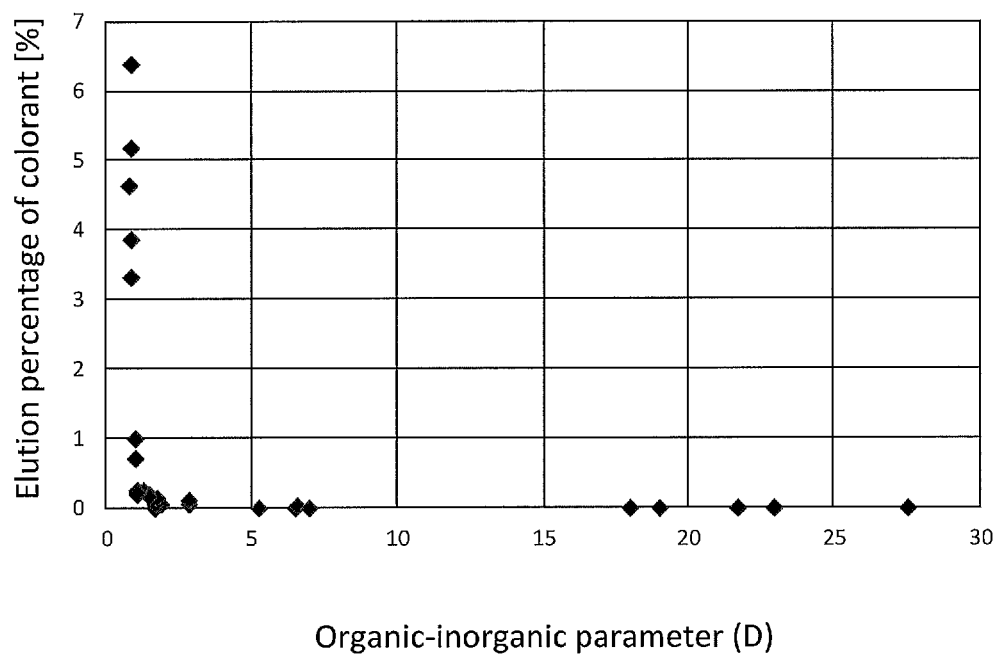
FIG. 5A is a graph showing a relationship between an elution percentage of a colorant and an organic-inorganic parameter (D).
Figure 5B:
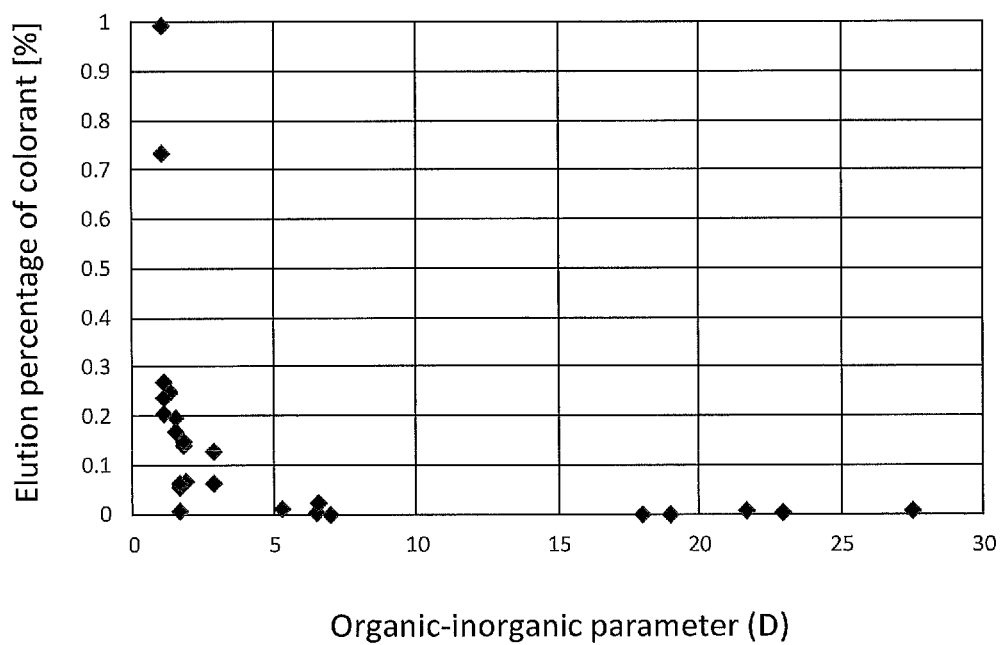
FIG. 5B is a graph showing a relationship between an elution percentage of a colorant and an organic-inorganic parameter (D).
Figure 6A:
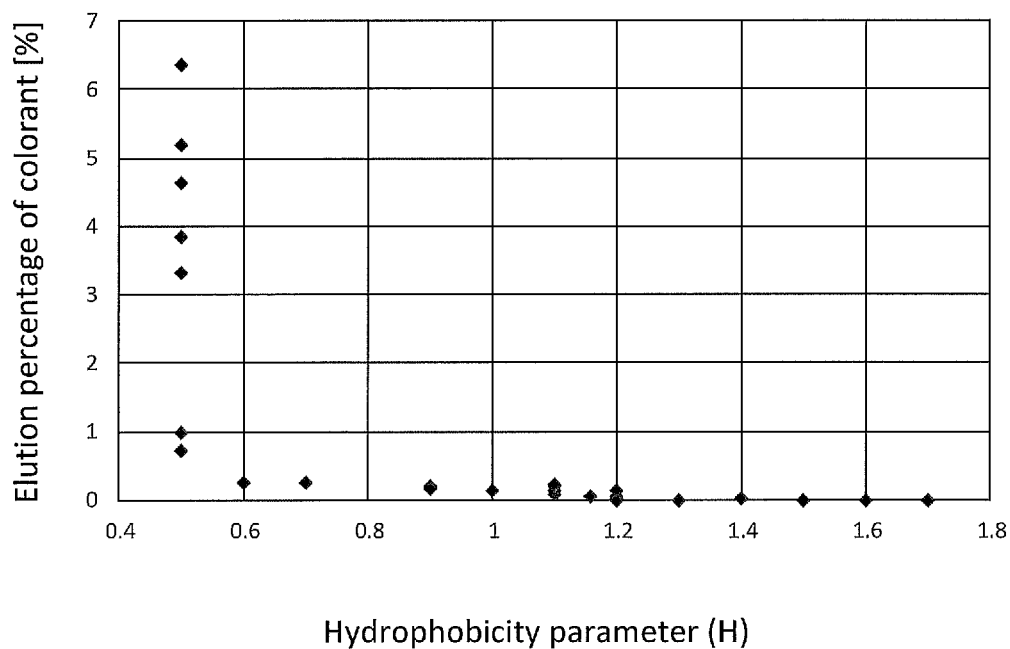
FIG. 6A is a graph showing a relationship between the elution percentage of the colorant and a hydrophobicity parameter (H).
Figure 6B:
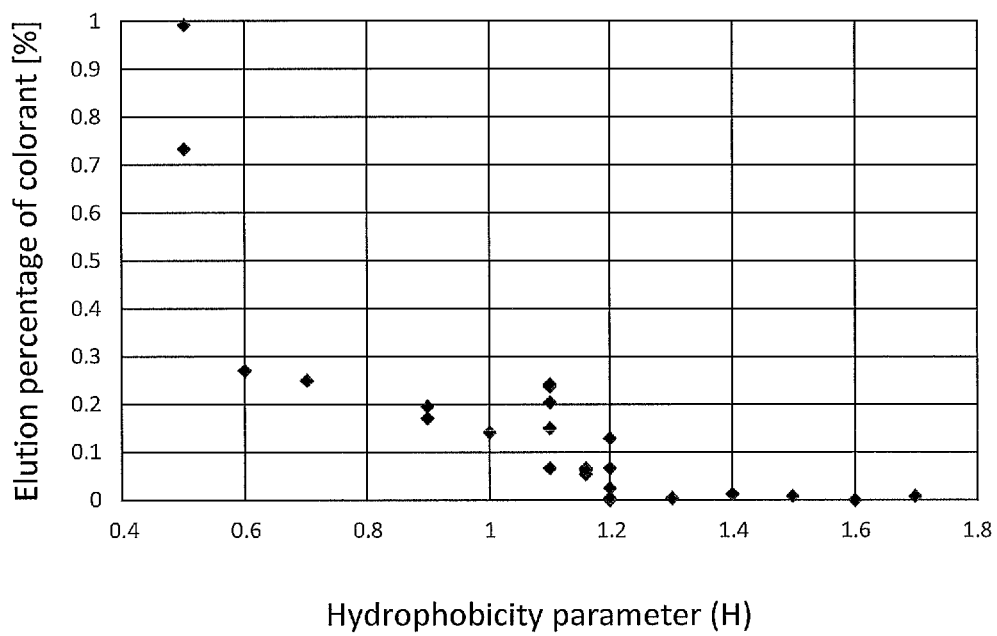
FIG. 6B is a graph showing a relationship between the elution percentage of the colorant and a hydrophobicity parameter (H).

FIG. 5A shows a relationship between the elution percentage of the colorant and the organic-inorganic parameter (D) with respect to the colorant-containing solid material according to each Example. FIG. 5B shows a relationship between the elution percentage of the colorant and the organic-inorganic parameter (D) with respect to the colorant-containing solid material according to each Comparative Example. FIG. 6A shows a relationship between the elution percentage of the colorant and the hydrophobicity parameter (H) with respect to the colorant-containing solid material according to each Example. FIG. 6B shows a relationship between the elution percentage of the colorant and the hydrophobicity parameter (H) with respect to the colorant-containing solid material according to each Comparative Example.

Example 1

440 g of ion exchanged water, 20 g of 1% acetic acid (available from Kishida Chemical Co., Ltd.), 186.8 g of methyltriethoxysilane (available from Tama Chemicals Co., Ltd.) and 244 g of ethyl orthosilicate (available from Tama Chemicals Co., Ltd.) were mixed and the resulting mixture was allowed to react at 60° C. for 5 hours. Then, the temperature of the reaction liquid was maintained at 30° C., and the reaction liquid was left without being stirred and was matured for 48 hours while the reaction container remained closed. Thereby, a sol was obtained. 500 g of ion exchanged water was mixed with 400 g of this sol, and 16.7 g of red color No. 104-(1) (available from Kishi Kasei Co., Ltd.) was dissolved therein to obtain a colorant-containing sol according to Example 1. The colorant-containing sol according to Example 1 was spray-dried to produce a solidified product according to Example 1. The solidified product according to Example 1 was heat-treated at 250° C. for 2 hours to obtain a colorant-containing solid material according to Example 1. In the colorant-containing solid material according to Example 1, the content of the colorant was 20 mass %. Also, in the colorant-containing solid material according to Example 1, the ratio of the mass of a polysilsesquioxane to the mass of a silica was 1.

Examples 2 to 8

Colorant-containing solid materials according to Examples 2 to 8, respectively, were produced in the same manner as in Example 1, except that the maturing period for the reaction liquid and the temperature at which the solidified product was heat-treated were adjusted as shown in Table 1.

Example 9

A colorant-containing solid material according to Example 9 was produced in the same manner as in Example 2, except that blue color No. 1 (available from Kishi Kasei Co., Ltd.) 1 was used instead of the red color No. 104-(1).

Example 10

A colorant-containing solid material according to Example 10 was produced in the same manner as in Example 4, except that red color No. 104-(1) AL-LAKE (available from Kishi Kasei Co., Ltd.) was used instead of the red color No. 104-(1).

Example 11

A colorant-containing solid material according to Example 11 was produced in the same manner as in Example 4, except that blue color No. 1 AL-LAKE (available from Kishi Kasei Co., Ltd.) was used instead of the red color No. 104-(1).

Example 12

A colorant-containing solid material according to Example 12 was produced in the same manner as in Example 6, except that yellow color No. 4 (available from Kishi Kasei Co., Ltd.) was used instead of the red color No. 104-(1).

Example 13

A colorant-containing solid material according to Example 13 was produced in the same manner as in Example 3, except that red color No. 202 (D & C Red No. 7, general name "Litholrubin BCA", available from Kishi Kasei Co., Ltd.) was used instead of the red color No. 104-(1).

Example 14

A colorant-containing solid material according to Example 14 was produced in the same manner as in Example 3, except that red color No. 230 (D & C Red No. 22, general name "Eosine YS", available from Kishi Kasei Co., Ltd.) was used instead of the red color No. 104-(1).

Example 15

A colorant-containing solid material according to Example 15 was produced in the same manner as in Example 14, except that instead of being heat-treated as in Example 14, the solidified product was heat-treated in a sample chamber adjusted to 100° C. and 1 Torr by use of a vacuum dryer.

Example 16

A colorant-containing solid material according to Example 16 was produced in the same manner as in Example 1, except that the reaction liquid was not matured and the solidified product was not heat-treated.

Examples 17 and 18

Colorant-containing solid materials according to Examples 17 and 18, respectively, were produced in the same manner as in Example 1, except that the reaction liquid was not matured and the temperature at which the solidified product was heat-treated was adjusted as shown in Table 1.

Example 19

A colorant-containing solid material according to Example 19 was produced in the same manner as in Example 1, except that the maturing time for the reaction liquid was changed to 24 hours and the solidified product was not heat-treated.

Example 20

A colorant-containing solid material according to Example 20 was produced in the same manner as in Example 1, except that the maturing period for the reaction liquid and the temperature at which the solidified product was heat-treated were adjusted as shown in Table 1.

Example 21

A colorant-containing solid material according to Example 21 was produced in the same manner as in Example 1, except that the solidified product was not heat-treated.

Example 22

A colorant-containing solid material according to Example 22 was produced in the same manner as in Example 1, except that the temperature at which the solidified product was heat-treated was adjusted as shown in Table 1.

Example 23

A colorant-containing solid material according to Example 23 was produced in the same manner as in Example 9, except that the solidified product was not heat-treated.

Example 24

A colorant-containing solid material according to Example 24 was produced in the same manner as in Example 12, except that the solidified product was not heat-treated.

Example 25

A colorant-containing solid material according to Example 25 was produced in the same manner as in Example 7, except that red color No. 218 (D & C RED No. 27, available from Kishi Kasei Co., Ltd.) was used instead of the red color No. 104-(1) and the solidified product was not heat-treated.

Comparative Example 1

A colorant-containing solid material according to Comparative Example 1 was produced in the same manner as in Example 1, except that a cured product obtained by heating the sol at a predetermined temperature in a sample bottle without being spray-dried was ground in a mortar to obtain a solidified product which was powder, and the solidified product was heat-treated at 40° C.

Comparative Example 2

A colorant-containing solid material according to Comparative Example 2 was produced in the same manner as in Example 9, except that a cured product obtained by heating the sol at a predetermined temperature in a sample bottle without being spray-dried was ground in a mortar to obtain a solidified product which was powder, and the solidified product was heat-treated at 35° C.

Comparative Example 3

A colorant-containing solid material according to Comparative Example 3 was produced in the same manner as in Example 12, except that a cured product obtained by heating the sol at a predetermined temperature in a sample bottle without being spray-dried was ground in a mortar to obtain a solidified product which was powder, and the solidified product was heat-treated at 40° C.

Comparative Example 4

A colorant-containing solid material according to Comparative Example 4 was produced in the same manner as in Example 13, except that a cured product obtained by heating the sol at a predetermined temperature in a sample bottle without being spray-dried was ground in a mortar to obtain a solidified product which was powder, and the solidified product was heat-treated at 30° C.

Comparative Example 5

A colorant-containing solid material according to Comparative Example 5 was produced in the same manner as in Example 15, except that a cured product obtained by heating the sol at a predetermined temperature in a sample bottle without being spray-dried was ground in a mortar to obtain a solidified product which was powder, and the solidified product was heat-treated at 40° C.

Comparative Example 6

A colorant-containing solid material according to Comparative Example 6 was produced in the same manner as in Example 7, except that a cured product obtained by heating the sol at a predetermined temperature in a sample bottle without being spray-dried was ground in a mortar to obtain a solidified product which was powder, and the solidified product was heat-treated at 80° C.

Comparative Example 7

A colorant-containing solid material according to Comparative Example 7 was produced in the same manner as in Example 7, except that a cured product obtained by heating the sol at a predetermined temperature in a sample bottle without being spray-dried was ground in a mortar to obtain a solidified product which was powder, and the solidified product was heat-treated at 90° C.

As shown in Table 1, the elution percentages of the colorants of the colorant-containing solid materials according to Examples 1 to 25, respectively, were less than 0.3%. In contrast, the elution percentages of the colorants of the colorant-containing solid materials according to Comparative Examples 1 to 7, respectively, far exceeded 0.3%. This suggests that the colorants are unlikely to elute from the colorant-containing solid materials according to Examples 1 to 25, respectively.

As shown in FIG. 2 and FIG. 3, there is no great difference between the infrared transmission spectrum of the colorant-containing solid material according to Example 1 and that of the colorant-containing solid material according to Example 16 in terms of the absorption band derived from a bond between a silicon atom and a methyl group. This suggests that the bond (Si—CH$_3$) between a silicon atom and a methyl group is stable with respect to the ranges of the maturing time and the heat-treatment temperature in Examples. In contrast, the absorption band derived from hydrocarbon groups that each are not directly bound to a silicon atom and the absorption band derived from a bond between a silicon atom and a hydroxy group in the infrared transmission spectrum of the colorant-containing solid material according to Example 1 are smaller than the respective counterparts in the infrared transmission spectrum of the colorant-containing solid material according to Example 16. Accordingly, the organic-inorganic parameter (D) and the hydrophobicity parameter (H) of the colorant-containing solid material according to Example 1 are greater than the respective counterparts of the colorant-containing solid material according to Example 16. This suggests that the inorganic ingredient density was more increased and the hydrophobicity was more enhanced in the colorant-containing solid material according to Example 1 than in the colorant-containing solid material according to Example 16.

As shown in Table 1, at least one of the conditions that the organic-inorganic parameter (D) was 1.1 or more and that the hydrophobicity parameter (H) was 0.6 or more was satisfied in the colorant-containing solid material according to each Example. The elution prevention factors of the colorant-containing solid materials according to Examples 1 to 3, respectively, were three times or greater the elution prevention factor of the colorant-containing solid material according to Example 21. Also, the elution prevention factors of the colorant-containing solid materials according to Examples 4 to 6, respectively, were three times or greater the elution prevention factor of the colorant-containing solid material according to Example 19. Furthermore, the elution prevention factors of the colorant-containing solid materials according to Examples 7 and 8, respectively, were three times or greater the elution prevention factor of the colorant-containing solid material according to Example 16. This suggests that heat-treating the solidified product at a suitable temperature results in satisfying at least one of the conditions that the organic-inorganic parameter (D) is 1.9 or more and that the hydrophobicity parameter (H) is 1.2 or more, and thereby a colorant-containing solid material from which the colorant is unlikely to elute can be produced.

As shown in Table 1, the elution prevention factor of the colorant-containing solid material according to Example 9 was 33 times or greater the elution prevention factor of the colorant-containing solid material according to Example 23. Moreover, the elution prevention factor of the colorant-containing solid material according to Example 12 was two times or greater the elution prevention factor of the colorant-containing solid material according to Example 24.

As shown in Table 1, the elution percentages of the colorants of the colorant-containing solid materials according to Examples 10 and 11, respectively, were 0%.

TABLE 1

| | | Production conditions | | | | | |
|---|---|---|---|---|---|---|---|
| | Colorant | Maturing time [Hour] | Heat-treatment temperature [° C.] | Organic-inorganic parameter (D) | Hydrophobicity parameter (H) | Elution percentage [%] | Elution prevention factor |
| Example 1 | Red color No. 104-(1) | 48 | 250 | 23.0 | 1.3 | 0.001 | 1205 |
| Example 2 | Red color No. 104-(1) | 48 | 200 | 6.5 | 1.2 | 0.002 | 402 |
| Example 3 | Red color No. 104-(1) | 48 | 150 | 1.9 | 1.1 | 0.067 | 15 |
| Example 4 | Red color No. 104-(1) | 24 | 250 | 21.7 | 1.7 | 0.007 | 151 |
| Example 5 | Red color No. 104-(1) | 24 | 200 | 5.3 | 1.4 | 0.012 | 80 |
| Example 6 | Red color No. 104-(1) | 24 | 150 | 2.9 | 1.2 | 0.065 | 15 |
| Example 7 | Red color No. 104-(1) | 0 | 250 | 27.5 | 1.5 | 0.007 | 134 |
| Example 8 | Red color No. 104-(1) | 0 | 200 | 6.6 | 1.2 | 0.024 | 42 |
| Example 9 | Blue color No. 1 | 48 | 200 | 7.0 | 1.2 | 0 | ∞ |
| Example 10 | Red color No. 104-(1) AL-LAKE | 24 | 250 | 18.0 | 1.6 | 0 | ∞ |
| Example 11 | Blue color No. 1 AL-LAKE | 24 | 250 | 19.0 | 1.6 | 0 | ∞ |
| Example 12 | Yellow color No. 4 | 24 | 150 | 1.7 | 1.2 | 0.005 | 200 |
| Example 13 | Red color No. 202 | 48 | 150 | 1.7 | 1.2 | 0.064 | 16 |
| Example 14 | Red color No. 230 | 48 | 150 | 1.7 | 1.2 | 0.055 | 18 |
| Example 15 | Red color No. 230 | 48 | 100 (Vacuum) | 1.7 | 1.2 | 0.062 | 16 |
| Example 16 | Red color No. 104-(1) | 0 | — | 1.3 | 0.7 | 0.249 | 4 |
| Example 17 | Red color No. 104-(1) | 0 | 110 | 1.5 | 0.9 | 0.195 | 5 |
| Example 18 | Red color No. 104-(1) | 0 | 150 | 1.8 | 1.0 | 0.142 | 7 |

TABLE 1-continued

|  | Colorant | Production conditions | | | | | |
|---|---|---|---|---|---|---|---|
|  |  | Maturing time [Hour] | Heat-treatment temperature [° C.] | Organic-inorganic parameter (D) | Hydrophobicity parameter (H) | Elution percentage [%] | Elution prevention factor |
| Example 19 | Red color No. 104-(1) | 24 | — | 1.1 | 1.1 | 0.235 | 4 |
| Example 20 | Red color No. 104-(1) | 24 | 110 | 1.8 | 1.1 | 0.150 | 7 |
| Example 21 | Red color No. 104-(1) | 48 | — | 1.1 | 0.6 | 0.271 | 4 |
| Example 22 | Red color No. 104-(1) | 48 | 110 | 1.5 | 0.9 | 0.169 | 6 |
| Example 23 | Blue color No. 1 | 48 | — | 1.1 | 1.1 | 0.203 | 5 |
| Example 24 | Yellow color No. 4 | 24 | — | 1.1 | 1.1 | 0.239 | 4 |
| Example 25 | Red color No. 218 | 0 | — | 2.9 | 1.2 | 0.128 | 8 |
| C. Example 1 | Red color No. 104-(1) | 48 | 40 | 0.9 | 0.4 | 3.323 | 0.3 |
| C. Example 2 | Blue color No. 1 | 48 | 35 | 0.9 | 0.3 | 5.182 | 0.2 |
| C. Example 3 | Yellow color No. 4 | 24 | 40 | 0.9 | 0.4 | 3.861 | 0.3 |
| C. Example 4 | Red color No. 202 | 48 | 30 | 0.8 | 0.3 | 4.654 | 0.2 |
| C. Example 5 | Red color No. 230 | 48 | 40 | 0.9 | 0.4 | 6.378 | 0.2 |
| C. Example 6 | Red color No. 104-(1) | 0 | 80 | 1.0 | 0.5 | 0.994 | 1.0 |
| C. Example 7 | Red color No. 104-(1) | 0 | 90 | 1.0 | 0.5 | 0.733 | 1.4 |

The invention claimed is:

1. A colorant-containing solid material comprising:
a colorant that is not a pigment; and
a matrix that is formed of a silica and a polysilsesquioxane and covers the colorant, wherein,
only polymer having a network composed of Si—O—Si is present as a polymer in the matrix and inside the network of Si—O—Si, and
when an absorption intensity derived from a hydrocarbon group that is not directly bonded to a silicon atom, an absorption intensity derived from a bond between a silicon atom and a non-reactive functional group, and an absorption intensity derived from a bond between a silicon atom and a hydroxy group, determined by an infrared spectroscopic analysis based on a KBr pellet method using a Fourier transform infrared spectrophotometer, are denoted as Ia, Ib, and Ic, respectively, at least one of conditions Ib/Ia≥1.1 and Ib/Ic≥0.6 is satisfied.

2. The colorant-containing solid material according to claim 1, wherein the conditions Ib/Ia≥1.1 and Ib/Ic≥0.6 are further satisfied.

3. The colorant-containing solid material according to claim 1, wherein at least one of conditions Ib/Ia≥1.9 and Ib/Ic≥1.2 is further satisfied.

4. The colorant-containing solid material according to claim 1, wherein a ratio of a mass of the polysilsesquioxane to a mass of the silica in the matrix is 1/9 to 9.

5. The colorant-containing solid material according to claim 1, wherein
the silica is formed by hydrolysis and dehydration condensation of a tetrafunctional alkoxysilane, and
the polysilsesquioxane is formed by hydrolysis and dehydration condensation of a trifunctional alkoxysilane.

6. The colorant-containing solid material according to claim 1, wherein the polysilsesquioxane is a polysilsesquioxane in which a hydrocarbon group having 16 or less carbon atoms is bonded to a silicon atom as the non-reactive functional group.

7. The colorant-containing solid material according to claim 1, wherein the colorant is a dye.

* * * * *